US 6,443,488 B1

(12) United States Patent
Kippelt et al.

(10) Patent No.: US 6,443,488 B1
(45) Date of Patent: Sep. 3, 2002

(54) DEVICE FOR PROTECTING VEHICLE OCCUPANTS IN A MOTOR VEHICLE AND METHOD FOR CONTROLLING THE INFLATION OF AN AIRBAG IN A MOTOR VEHICLE

(75) Inventors: Ulrich Kippelt, Mutlangen; Peter Popp, Regensburg, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/521,498

(22) Filed: Mar. 9, 2000

Related U.S. Application Data

(63) Continuation of application No. PCT/DE98/02430, filed on Aug. 20, 1998.

(30) Foreign Application Priority Data

Sep. 9, 1997 (DE) .......................... 197 39 497

(51) Int. Cl.⁷ .............................................. B60R 21/32
(52) U.S. Cl. ......................................... 280/735; 701/45
(58) Field of Search ............................. 280/735; 701/45

(56) References Cited

U.S. PATENT DOCUMENTS

| | | | | |
|---|---|---|---|---|
| 5,359,515 A | * | 10/1994 | Weller et al. | 364/424.05 |
| 5,398,185 A | * | 3/1995 | Omura | 364/424.05 |
| 5,400,487 A | | 3/1995 | Gioutsos et al. | 280/735 |
| 5,411,289 A | * | 5/1995 | Smith et al. | 280/735 |
| 5,413,378 A | | 5/1995 | Steffens et al. | 280/733 |
| 5,454,591 A | | 10/1995 | Mazur et al. | 280/735 |
| 5,501,293 A | * | 3/1996 | Borjesson et al. | 180/268 |
| 5,552,986 A | * | 9/1996 | Omura et al. | 364/424.05 |
| 5,626,359 A | * | 5/1997 | Steffens, Jr. et al. | 280/735 |
| 5,653,462 A | * | 8/1997 | Breed et al. | 280/735 |
| 5,785,347 A | * | 7/1998 | Adolph et al. | 280/735 |
| 5,788,281 A | * | 8/1998 | Yanagi et al. | 280/806 |
| 5,848,802 A | * | 12/1998 | Breed et al. | 280/735 |
| 5,901,978 A | * | 5/1999 | Breed et al. | 280/735 |
| 5,906,393 A | * | 5/1999 | Mazur et al. | 280/735 |
| 6,027,138 A | * | 2/2000 | Tanaka et al. | 280/735 |
| 6,036,225 A | * | 3/2000 | Foo et al. | 280/735 |
| 6,039,139 A | * | 3/2000 | Breed et al. | 180/271 |
| 6,043,736 A | * | 3/2000 | Sawahata et al. | 340/438 |
| 6,079,738 A | * | 6/2000 | Lotito et al. | 280/735 |
| 6,082,764 A | * | 7/2000 | Seki et al. | 280/735 |
| 6,099,031 A | * | 8/2000 | Bischoff | 280/735 |

FOREIGN PATENT DOCUMENTS

| | | |
|---|---|---|
| DE | 40 32 757 A1 | 4/1992 |
| DE | 44 10 402 A1 | 9/1994 |
| DE | 196 10 833 A1 | 9/1996 |
| EP | 0 798 176 A1 | 10/1997 |

* cited by examiner

*Primary Examiner*—Paul N. Dickson
*Assistant Examiner*—L. Lum
(74) *Attorney, Agent, or Firm*—Laurence A. Greenberg; Werner H. Stemer; Gregory L. Mayback

(57) ABSTRACT

A device for protecting a vehicle occupant includes an airbag, a first sensor which detects the presence of an object or of the vehicle occupant in a danger area into which the airbag unfolds as it inflates, and a second sensor for measuring the unrolled belt length of a belt device which is assigned to a vehicle seat. An evaluator controls the inflation of the airbag as a function of the detection of the object or of the vehicle occupant in the danger area and as a function of the belt length. A method for controlling the inflation of an airbag is also provided.

9 Claims, 2 Drawing Sheets

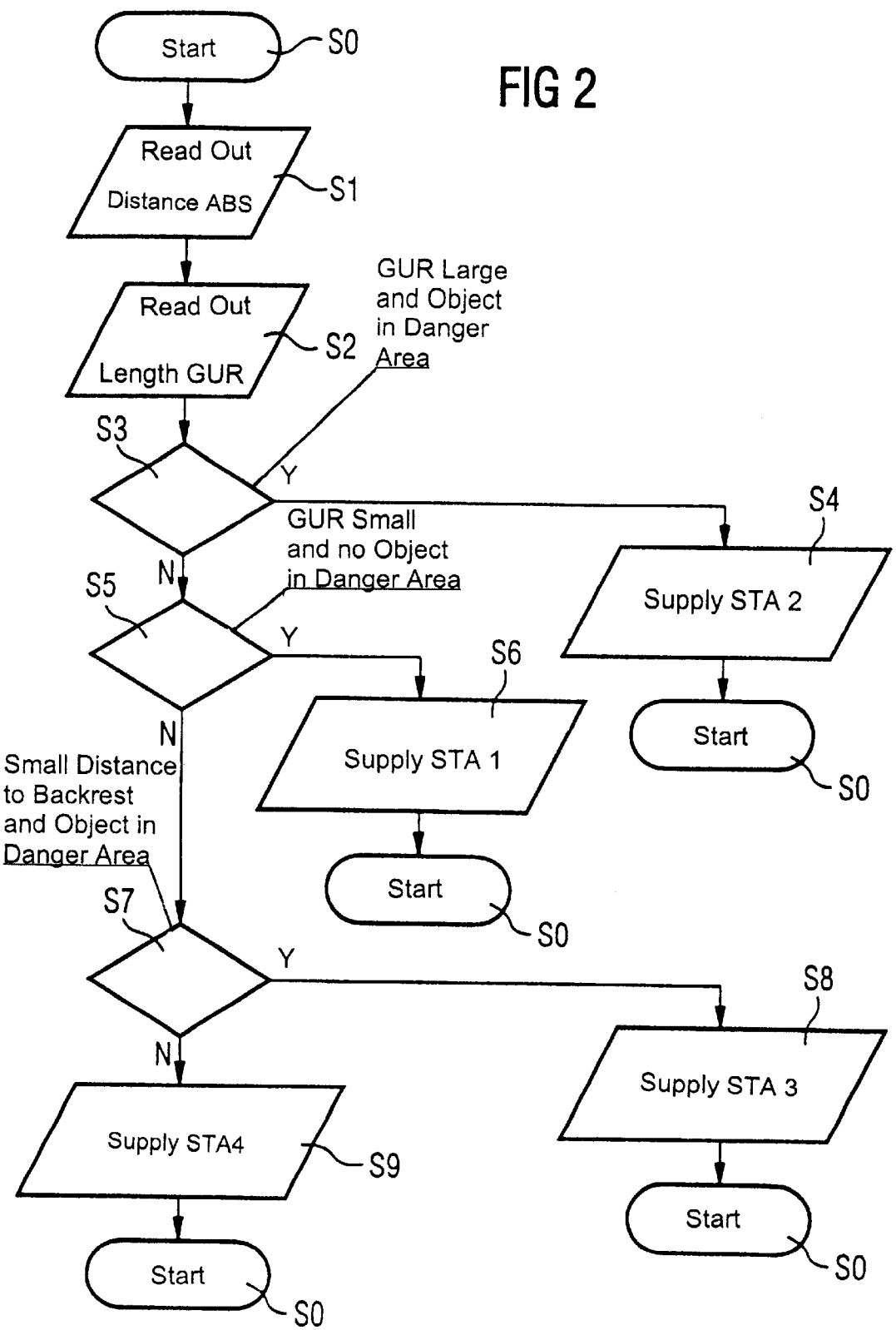

US 6,443,488 B1

Figure 1:
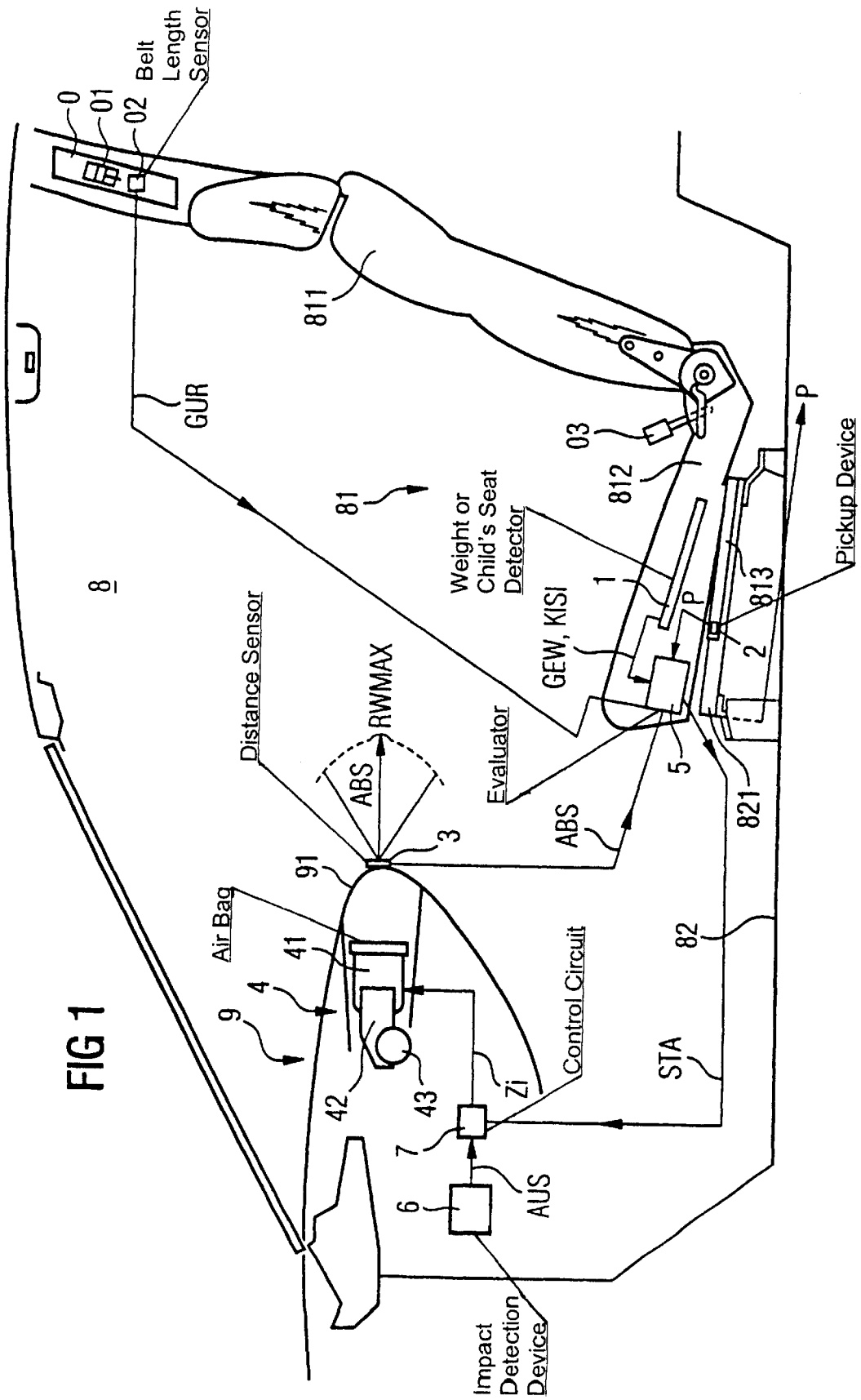

DEVICE FOR PROTECTING VEHICLE OCCUPANTS IN A MOTOR VEHICLE AND METHOD FOR CONTROLLING THE INFLATION OF AN AIRBAG IN A MOTOR VEHICLE

CROSS-REFERENCE TO RELATED APPLICATION

This application is a continuation of copending International Application No. PCT/DE98/02430, filed Aug. 20, 1998, which designated the United States.

BACKGROUND OF THE INVENTION

Field of the Invention

The invention relates to a device for protecting vehicle occupants in a motor vehicle and a method for controlling the inflation of an airbag in a motor vehicle.

The requirements made of the latest devices for protecting vehicle occupants in a motor vehicle go far beyond the simple inflation of an airbag when an impact is detected: a vehicle occupant may possibly be injured by an airbag which is inflated with its full force if, before the inflation or at the start of the inflation, the entire body or individual parts of the body of the vehicle occupant are located in an area which will be occupied several milliseconds later by the volume of the completely inflated airbag. For this reason, it is desirable to determine the position of the vehicle occupant and either to prevent the airbag from being triggered or merely to gently fill an airbag, which can be inflated in multiple stages, if it is detected that the vehicle occupant has moved forward.

A device for detecting the position of a vehicle occupant or of an object on a vehicle seat is disclosed in U.S. Pat. No. 5,413,378. The position of the vehicle occupant is determined through the use of three ultrasonic sensors which are provided in the dashboard, in the backrest of the vehicle seat and Oalong the side of the vehicle seat. The sensors sense a vehicle occupant or an object in the space between the backrest of the vehicle seat and the dashboard. An evaluator determines the position of the vehicle occupant from the sensor signals.

Due to the sensing of the space described above, each ultrasonic sensor must have a range of somewhat more than a meter. This relatively large range causes a relatively low resolution, with the result that distances can be determined with only on a relatively inaccurate scale. For a controlled inflation of the airbag, a high resolution of the distance measurement is necessary. However, on the other hand, it is not necessary to sense every possible position of the vehicle occupant. Furthermore, mounting an ultrasonic sensor in the backrest of the vehicle seat is costly because a passage opening through the cover of the backrest is necessary. Such a configuration of the sensor also adversely affects the sitting comfort.

SUMMARY OF THE INVENTION

It is accordingly an object of the invention to provide a device for protecting vehicle occupants in a motor vehicle and a method for controlling the inflation of an airbag which overcome the above-mentioned disadvantages of the heretofore-known devices and methods of this general type and which, in particular, provide a high resolution along with a simple and cost-effective production.

With the foregoing and other objects in view there is provided, in accordance with the invention, in combination with a motor vehicle including a vehicle seat and a belt device assigned to the vehicle seat, the belt device having an unrolled belt length, a device for protecting a vehicle occupant, including:

an airbag for protecting the vehicle occupant on the vehicle seat, the air bag having a danger area defined by an unfolded, inflated state of the airbag;

a first sensor for detecting a presence of an object or the presence of the vehicle occupant in the danger area;

a second sensor for measuring the unrolled belt length; and an evaluator, connected to the first sensor, to the second sensor and to the airbag, for controlling an inflation of the airbag as a function of a detection of the presence of the object or the vehicle occupant in the danger area and as a function of the unrolled belt length, the evaluator determining a change in the unrolled belt length based on the unrolled belt length measured at a current time and the unrolled belt length measured at an earlier time.

In other words, a sensor is provided which detects the presence of. an object or of a vehicle occupant in a danger area in front of the airbag. The airbag unfolds as it inflates into the space between the steering wheel or dashboard and the vehicle occupant. The space which the airbag takes up after its inflation constitutes simultaneously a danger area for the vehicle occupant at the time of the inflation. If part of the body of the vehicle occupant is located in this danger area at the time of the inflation, there is a considerable risk of injury by the inflating airbag. With the sensor which is embodied in particular as a distance sensor, only, or at least, the danger area directly in front of the airbag device is sensed, that is to say that area into which the airbag will unfold in the event of an impact. Due to the relatively short range which such a sensor has to have in order to sense the danger area—in particular less than 40 cm if the sensor is provided, for example, on the dashboard—the scanning or sampling precision is increased, in particular because the algorithm for processing the distance which is determined can be simplified, and therefore more computational power is available for determining distances with a higher scanning or sampling rate. Furthermore, a sensor is provided for the unrolled seat belt length—referred to below in abbreviated form as "belt length"—of a belt device which is assigned to the vehicle seat. The unrolled belt length and in this context in particular the change in the belt length over time is a measure of the position of the upper part of the body of the vehicle occupant in the vehicle seat. An evaluator controls the inflation of the airbag as a function of the distance determined and the belt length determined. In doing so, the decision that, due to the strength of the impact, the airbag is to be inflated in order to protect the vehicle occupant is usually made by the evaluator as a function of an impact detection device—for example in the form of an acceleration sensor. However, the evaluator influences this decision to the effect that it determines the degree to which the airbag is to be inflated as a function of the unrolled belt length and as a function of whether an object or a vehicle occupant is detected in the danger area, and at the same time it is also possible to prevent the inflation.

The advantage of the device according to the invention is that the position of the vehicle occupant is detected with high resolution. The resolution-sensitive, relatively weakly irradiating distance sensor and the provision of the further sensor for determining the distance between the vehicle occupant and the backrest of the vehicle seat as a sensor for the unrolled belt length actually provide a device which can be provided at low cost and has a high resolution for the vehicle occupant position which is determined. With these two sensors alone, the vehicle occupant who is sitting in a normal position and leaning against the backrest is distinguished not only from the vehicle occupant who is displaced forward in the direction of the dashboard but also from a vehicle occupant who is, for example, reading a newspaper in a normal sitting position. Furthermore, it is not necessary to make any mechanical interventions in the vehicle seat. In addition, the radiation exposure for the vehicle occupant is greatly reduced. Nevertheless, all the information which is necessary to determine the position of the vehicle occupant, and in particular to be able to distinguish between different positions of the vehicle occupant, is supplied.

In accordance with another feature of the invention, the first sensor for detecting the object or the vehicle occupant in the danger area is an infrared sensor.

In accordance with yet another feature of the invention, an impact detection device is connected to the airbag for detecting an impact. A weight detector is connected to the evaluator for detecting a weight provided on the vehicle seat. The evaluator controls the inflation of the airbag as a function of the impact and as function of the weight.

In accordance with a further feature of the invention, a child's seat detection device is connected to the evaluator for detecting a child's seat provided on the vehicle seat and for supplying a status signal. The evaluator controls the inflation of the airbag additionally as a function of the status signal.

In accordance with yet a further feature of the invention, the airbag is inflatable in multiple stages and the evaluator controls the inflation of the airbag by additionally selecting one of the multiple stages.

In accordance with another feature of the invention, the evaluator selectively suppresses and permits the inflation of the airbag in response to an impact. The evaluator permits the inflation of the airbag only to a first volume stage if the object or the vehicle occupant is detected in the danger area and if the unrolled belt length or the change in the unrolled belt length exceeds a limiting value.

In accordance with yet another feature of the invention, the evaluator permits the inflation of the airbag in response to an impact if the object or the vehicle occupant is detected in the danger area and if the unrolled belt length or the change in the unrolled belt length is less than a limiting value.

With the objects of the invention in view there is also provided, a method for controlling an inflation of an airbag in a motor vehicle, which includes the steps of:

detecting, with a first sensor, a presence of an object or a vehicle occupant in a danger area defined by an unfolded, inflated state of an airbag;

detecting, with a second sensor, an unrolled belt length of a belt device assigned to a vehicle seat;

controlling, with an evaluator, an inflation of the airbag as a function of a detection of the object or the vehicle occupant in the danger area and as a function of the unrolled belt length; and determining, with the evaluator, a change in the unrolled belt length from a currently measured unrolled belt length and a previously measured unrolled belt length.

In accordance with another mode of the invention, the inflation of the airbag due to an impact is selectively suppressed or permitted only to a first volume stage of a plurality of volume stages if the object or the vehicle occupant is detected in the danger area and if the unrolled belt length or the change in the unrolled belt length exceeds respective limiting value.

Other features which are considered as characteristic for the invention are set forth in the appended claims.

Although the invention is illustrated and described herein as embodied in a device for protecting vehicle occupants in a motor vehicle and a method for controlling the inflation of an airbag in a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTIONS OF THE DRAWINGS

FIG. 1 is a diagrammatic view of an interior of a motor vehicle having the device according to the invention; and FIG. 2 is a flowchart for an evaluation method in the evaluator of the device according to the invention.

DESCRIPTION OF THE PREFERRED EMBODIMENTS

Referring now to the figures of the drawings in detail and first, particularly, to FIG. 1 thereof, there is shown a passenger cell 8 in which a vehicle seat 81 with a vehicle seat backrest 811 and a vehicle seat bottom component 812 is displaceably mounted, through the use of a seat rail 813 connected to the vehicle seat bottom component 812, on a rail 821 which is connected to the floor 82 of the vehicle. A belt device 0 with a belt strap 01 which is wound onto a roller and is unrolled when the belt is put on is attached to the B pillar of the motor vehicle. A locking component (not shown) of the belt strap 01 forms, together with a belt lock 03, a lock when the seat belt is put on. A sensor 02 is provided here for the unrolled belt length GUR.

A transducer or pickup device 2 for the position of the vehicle seat is provided on the seat rail 813. This pickup device 2 determines the position P of the vehicle seat along the axis shown. The vehicle seat 81 also contains an apparatus 1 for detecting weight or detecting a child's seat. The apparatus 1 supplies the status signals GEW and KISI, respectively, as a function of a weight, or of a detected child's seat, provided on the vehicle seat 81.

In the dashboard apparatus 9, an airbag device 4 containing a folded-up airbag 41, a gas generator 42 and a mount 43 is as provided behind an airbag cover 91. A distance sensor 3, which scans, with a single beam, the danger area, shown by a broken line, in front of the airbag 41, and detects an object or a vehicle occupant in this danger area if the registered distance ABS is smaller than the maximum range RWMAX.

An evaluator 5, which is provided in the vehicle seat 81, evaluates the distance ABS of the distance sensor 3, the unrolled belt length GUR of the sensor for the unrolled belt length 02, the status signals GEW or KISI of the apparatus 1 for detecting weight or detecting a child's seat and the vehicle seat position P of the pickup device 2 for the vehicle seat position. In the process, the change in belt length is determined within a predefined time period, in particular by forming differences between an unrolled belt length, which was determined previously, and the currently determined unrolled belt length. The position of a vehicle occupant or of an object is determined based on the distance ABS and the belt length GUR or the change in belt length, respectively.

Preferably, a first status signal STA1 is output by the evaluator 5 to a control circuit 7 for triggering the airbag 41, if the apparatus 1 for detecting weight supplies a weight signal GEW which allows to conclude that a vehicle occupant on the vehicle seat 81 is present—the weight signal GEW being, in particular, greater than a predefined threshold value—and at the same time the unrolled belt length GUR drops below a relatively low limiting value and at the same time the distance sensor 3 does not detect an object or a vehicle occupant in its effective range. All these sensor signals allow to conclude that a vehicle occupant is present on the vehicle seat 81, the vehicle occupant leaning-back in a normal, sitting position. If an impact detection device 6 detects a strong impact which is sufficient to trigger the airbag 41, and therefore supplies a triggering signal AUS to the control circuit 7, the control circuit 7 generates a firing signal Z if the first status signal STA1 is detected at the same time.

If the apparatus 1 for detecting weight in turn detects a weight signal GEW which allows the presence of a vehicle occupant to be inferred, if the belt length GUR or the change in belt length exceeds a defined threshold value and if, at the same time, the distance sensor 3 detects an object or a vehicle occupant in its effective range, a second status signal STA2, which differs from the first status signal STA1, is supplied by the evaluator 5 to the control circuit 7. This second status signal STA2 characterizes a vehicle occupant who is displaced a long way forward and at least some of whose body parts are located in the danger area of the airbag 41. If the triggering signal AUS is present together with the second status signal STA2, the control circuit 7 prevents the firing signal Z from being generated because when the vehicle occupant is in such a position the risk of injury for the vehicle occupant is greater than the protection provided by the airbag. If the airbag 41 is embodied so as to be triggerable in multiple stages, the airbag 41 can, for example, therefore be inflated to two different volume stages by actuating a plurality of gas generators 42 which are assigned to the airbag 41, so that alternatively merely a first stage of the airbag 41 can be inflated through the use of an assigned gas generator 42 with a firing signal $Z_1$, which differs from the firing signals $Z_i$ for further gas generators 42. The filling volume of the airbag 41 is then dimensioned in such a way that, given the detected distance ABS of the vehicle occupant in front of the airbag cover 91, the inflation of the first stage does not present any danger for the vehicle occupant.

If, in turn, a vehicle occupant is detected and at the same time the belt length GUR or the change in belt length is small and is less than a predefined threshold value, but at the same time an object is detected in the effective range of the distance sensor 3, a third status signal STA3 is supplied to the control signal 7 by the evaluator 5. This third detector signal STA3 characterizes, in particular, a leaning-back vehicle occupant who is reading a newspaper. When the third status signal STA3 is present and the triggering signal AUS is present, the control circuit 7 preferably triggers a medium stage of a multiple stage airbag in order to provide, on the one hand, the vehicle occupant with a minimum level of protection, but also, on the other hand, take onto account the vehicle occupant's situation and/or position in the passenger cell which cannot be determined unambiguously in advance.

Preferably, in addition to the signals of the distance sensor 3 and of the sensor for the unrolled belt length 02, the vehicle seat position P of the pickup device for the position of the vehicle seat 2 in the evaluator 5 is also taken into account in the assessment of the current position of the vehicle occupant. A further status signal is preferably supplied by the evaluator 5 to the control circuit 7 if the apparatus 1 for detecting weight and/or a child's seat detects a child's seat positioned on the vehicle seat 81. The belt length GUR is then preferably not taken into account and only the distance ABS is checked: if the distance sensor 3 detects an object in its effective area, the child's seat is pointing toward the rear, that is to say its backrest is facing the dashboard device 9. Given such a position of an object, the control circuit 7 prevents the airbag 41 from inflating, due to the high degree of risk of injury to the child.

The invention also permits to further develop, refine or change the above-described embodiments: a distance sensor 3 is preferably embodied as an infrared sensor. It contains an infrared transmitter, which emits infrared light with a maximum range RWMAX according to FIG. 1. A vehicle occupant or object located in the effective area of the distance sensor 3 which is determined by the maximum range RWMAX reflects the infrared radiation, which is subsequently registered with photodetectors of the distance sensor 3. The evaluator 5 can make conclusions with regard to the distance between the sensor and the detected object on the basis of the propagation time between the output infrared signal and the received infrared signal, for example. However, the distance sensor can also operate according to other physical principles, for example it can output ultrasonic signals. The positioning of the distance sensor is not restricted to the airbag cover 91 or the dashboard apparatus 9. The distance sensor 3 can also be provided at the roof lining of the vehicle, in which case even with such a configuration only the so-called danger area in front of the airbag is sensed. The maximum range RWMAX of the distance sensor relates therefore to the extent of the danger area between the airbag apparatus and a potential object or vehicle occupant on the vehicle seat, but not necessarily to the absolute range of the sensor radiation. The distance sensor can, in particular, determine the desired distance with a single beam here, or scan with multiple beams an area, for example a sector shown by a broken line in FIG. 1, through the use of a relatively large number of radiation emitters and radiation detectors.

The belt device 0 may be provided not only on the B pillar but also on the vehicle seat 81. Different physical principles for length measurement, in particular using an optical device, are appropriate for determining the unrolled belt length GUR. The same applies to the pickup device 2 for the position of the vehicle seat. The detection device 1 for detecting the weight can also be carried out in particular with the aid of a sensor mat which changes its resistance as a function of weight. The apparatus 1 for detecting a child's seat preferably outputs an electromagnetic measuring field which is changed in a characteristic way by resonators in a child's seat.

The evaluator 5 and control circuit 7 may be implemented, in particular, using a common microprocessor which is disposed either in the vehicle seat 81 or at the vehicle tunnel or in the dashboard area. The impact detection device 6 with its acceleration sensors is also preferably provided in a common control unit together with the control circuit 7 and the evaluator 5.

FIG. 2 shows an exemplary method for determining the status signals STA which is processed in the evaluator 5. After the start in step S0, the distance ABS which is supplied by the sensor 3 for the danger area and is stored in a memory of the evaluator 5 is read out in step S1, and the unrolled belt length GUR which is also stored in the memory is read out in step S2. If, according to a check in S3, the belt length GUR is large, and if an object or vehicle occupant is detected in the danger area, the second status signal STA2 is output by the evaluator 5 in step S4, and a new cycle is subsequently started at step S0. The person is most probably seated near to the dashboard, with the result that the status signal STA2 has the effect of preventing the airbag from inflating. If, however, the interrogation in step S3 is negated, and if it is detected in step S5 that the belt length GUR is small and no object or vehicle occupant is detected in the danger area, the first status signal STA1 is output by the evaluator 5—the person is therefore sitting in a normal fashion on the vehicle seat—before new values are input at step S0. If the interrogation in step S5 is negated, and if it is determined in step S7 that both the distance from the backrest is small and that there is an object or vehicle occupant in the danger area, the status signal STA3 is supplied to the control circuit 7 at step S8—the person is sitting in a normal way but something is close to the dashboard—before the reading processes are started again at step S0. If the interrogation is negated in step S7, a status signal STA4 with the content "present state is indeterminate" is transmitted to the control circuit in step S9 before the procedure continues with step S0.

We claim:

1. In combination with a motor vehicle including a vehicle seat and a belt device assigned to the vehicle seat, the belt device having an unrolled belt length, a device for protecting a vehicle occupant, comprising:

an airbag for protecting the vehicle occupant on the vehicle seat, said airbag having a danger area defined by said airbag when being in an unfolded, inflated state;

a first sensor for detecting a presence of one of an object and the vehicle occupant in the danger area;

a second sensor for measuring the unrolled belt length; and an evaluator, connected to said first sensor, to said second sensor and to said airbag, for controlling an inflation of said airbag as a function of a detection of the presence of one of the object and the vehicle occupant in the danger area and as a function of the unrolled belt length, said evaluator determining a change in the unrolled belt length based on the unrolled belt length measured at a current time and the unrolled belt length measured at an earlier time.

2. The device according to claim 1, wherein said first sensor for detecting one of the object and the vehicle occupant in the danger area is an infrared sensor.

3. The device according to claim 1, including:

an impact detection device connected to said airbag for detecting an impact;

a weight detector connected to said evaluator for detecting a weight provided on the vehicle seat; and said evaluator controlling the inflation of said airbag as a function of the impact and as a function of the weight.

4. The device according to claim 1, including:

a child's seat detection device connected to said evaluator for detecting a child's seat provided on the vehicle seat and for supplying a status signal; and said evaluator controlling the inflation of said airbag additionally as a function of the status signal.

5. The device according to claim 1, wherein said airbag is inflatable in multiple stages, said evaluator controls the inflation of said airbag by additionally selecting one of the multiple stages.

6. The device accordin to claim 1, wherein said airba is inflatable to a plurality of volume stages including a first volume stage, said evaluator selectively suppresses and permits the inflation of said airbag in response to an impact, said evaluator permits the inflation of said airbag only to the first volume stage if one of the object and the vehicle occupant is detected in the danger area and if one of the unrolled belt length and the change in the unrolled belt length exceeds a respective limiting value.

7. The device according to claim 1, wherein said evaluator permits the inflation of said airbag in response to an impact if one of the object and the vehicle occupant is detected in the danger area and if one of the unrolled belt length and the change in the unrolled belt length is less than a respective limiting value.

8. A method for controlling an inflation of an airbag in a motor vehicle, the method which comprises:

detecting, with a first sensor, a presence of one of an object and a vehicle occupant in a danger area defined by an unfolded, inflated state of an airbag;

detecting, with a second sensor, an unrolled belt length of a belt device assigned to a vehicle seat;

controlling, with an evaluator, an inflation of the airbag as a function of a detection of one of the object and the vehicle occupant in the danger area and as a function of the unrolled belt length; and determining, with the evaluator, a change in the unrolled belt length from a currently measured unrolled belt length and a previously measured unrolled belt length.

9. The method according to claim 8, which comprises:

selectively suppressing and permitting the inflation of the airbag due to an impact; and permitting the inflation of the airbag only to a first volume stage of a plurality of volume stages if one of the object and the vehicle occupant is detected in the danger area and if one of the unrolled belt length and the change in the unrolled belt length exceeds a respective limiting value.

* * * * *